Patented June 17, 1952

2,600,376

UNITED STATES PATENT OFFICE 2,600,376

POLYESTERS OF HYDROXYBENZOIC ACIDS

John R. Caldwell, Kingsport, Tenn., assignor to Eastman Kodak Company, Rochester, N. Y., a corporation of New Jersey No Drawing. Application November 26, 1949, Serial No. 129,690

16 Claims. (Cl. 260—47)

This invention relates to polyesters of hydroxybenzoic acids and to processes for their preparation.

Low molecular weight polymers of hydroxybenzoic acids are described in Annalen der Chemie 372, 42, and in Berichte der Deutschen Chemischen Gesellshaft 15, 2588 (1882). The polymers so disclosed contain only a few units in their molecular chains and are accordingly of no value for the manufacture of fibers or other plastics products. They were made by means of the acid chloride. In Beilstein's Handbuch der Organischen Chemie 10, 134, 149, it is stated that hydroxybenzoic acids will not form linear polyesters when heated by themselves except to a very small extent. The hydroxybenzoic acids either sublime or decompose at their melting points.

In German Patent No. 344,034, patented March 26, 1920, there is disclosed a process for preparing resinous condensation products of aromatic hydroxycarboxylic acids which comprises heating mixtures of aromatic ortho-hydroxycarboxylic acids with acid condensation agents. The acid condensation agents disclosed are acetic anhydride, phosgene, phosphorus oxychloride, acetyl chloride and thionyl chloride. The aromatic acids treated are restricted to the ortho-hydroxycarboxylic acids and the specific acids treated are 2-hydroxy-3-methylbenzoic acid (ortho-cresotic acid or 2,3-cresotic acid), 2-hydroxy-4-methylbenzoic acid (metacresotic acid or 2,4-cresotic acid), 2-hydroxy-5-methylbenzoic acid (para-cresotic acid or 2,5-cresotic acid), and 2-hydroxybenzoic acid (salicylic acid), all of which acids have the hydroxy group in ortho relation to the carboxylic group. The products resulting from the process of the German patent are stated to be readily soluble in acetone, benzol, amyl acetate, paraldehyde, solvent naphtha, tetrahydronaphthalene and linseed oil and are stated to be suitable for use in the varnish and lacquer industry to produce good finishes when coated on metal, wood, etc. The molecular weights of these products are relatively low and none of these products are useful in the preparation of fibers, sheets, rods, films or molded products.

I have now found that new and valuable high molecular weight polyesters can be prepared by condensing, in the presence of an acid condensing agent and in the presence of certain catalysts, one or more of the meta- or para-hydroxybenzoic acids including nuclearly substituted derivatives thereof. By employing the catalyst and only the meta- and para-hydroxy forms of these acids, the resulting polymers soften above 180°–190° C. If the para-form is used in the amount of 50% or more (based on the total weight of the hydroxybenzoic acids employed), the softening point of the resulting resins is about 230°–260° C. In contrast, the products of the German patent soften at around 100° C. or less. The polymers made in accordance with my invention have molecular weights in the range of 5,000–10,000 and are soluble only in strong solvents such as hot phenol, hot cresol or formic acid; they are not soluble in acetone, amyl acetate, benzene and the other solvents described in the German patent which have been listed above.

Accordingly, the linear polyester resins made in accordance with my invention are valuable where high melting points and high resistance to solvents are required.

It is an object of my invention to provide high molecular weight polyesters of meta- and para-hydroxybenzoic acids having high melting points and excellent resistance to solvents. Another object is to provide a process for the preparation of these polyesters. Other objects will become apparent hereinafter.

In accordance with my invention I prepare valuable high molecular weight polyesters by condensing, in the presence of at least one of the lower molecular weight alkanoic anhydrides containing from 4 to 8 carbon atoms and in the presence of a compound selected from the group consisting of $ZnCl_2$, $ZnO$, the alkali metal oxides and hydroxides and the alkaline earth metal oxides and hydroxides, at least one of the hydroxybenzoic acids selected from the group consisting of those acids represented by the following two general formulas:

and

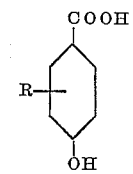

wherein R represents a member selected from among the group consisting of a hydrogen atom and the lower molecular weight alkyl and alkoxy radicals, the R group being attached in an ortho, meta or para position to the carboxy radical which is not already occupied by the hydroxy radical. Preferably, R represents a methyl, methoxy, ethyl or ethoxy radical or a hydrogen atom. Examples of such hydroxybenzoic acids which can be employed include m-hydroxybenzoic acid, p-hydroxybenzoic acid, the four isomers of methyl-m-hydroxybenzoic acid (known as 3,2-cresotic acid, 3,4-cresotic acid, 3,5-cresotic acid, and 3,6-cresotic acid), the two isomers of methyl-p-hydroxybenzoic acid (known as 4,2-cresotic acid and 4,3-cresotic acid), vanillic acid (viz. 4-hydroxy-3-methoxybenzoic acid), isovanillic acid (viz. 3-hydroxy-4-methoxybenzoic acid), etc.

The condensation can be advantageously conducted in a reaction vessel provided with a heating means, a vapor condensing means and a pressure reducing means, whereby the above defined hydroxybenzoic acid or acids together with the alkanoic anhydride and the catalyst are advantageously heated together under normal atmospheric pressure at a temperature at which the corresponding alkanoic acid distills off and is removed, following which the residue is gradually heated over a time period of several hours up to a temperature of from about 200° to about 280° C., during the last few hours of which time period, the pressure is greatly reduced.

Catalysts which can be advantageously employed include $ZnCl_2$, ZnO, CaO, NaOH, KOH, $Na_2O$, $K_2O$, and other alkali metal and alkaline earth metal oxides and hydroxides. It is advantageous to use from about 0.01 to about 0.5% of these catalysts based on the weight of hydroxybenzoic acids being condensed. Greater percentages of these catalysts can also be employed.

The alkanoic anhydrides are advantageously employed in the proportions of about 1.2 to about 2.0 mols per mol of the hydroxybenzoic acids employed although larger or smaller proportions can be employed. Examples of the alkanoic anhydrides which can be employed include acetic anhydride, propionic anhydride, butyric anhydride and isobutyric anhydride. Most advantageously, acetic anhydride is employed. The mixture of the alkanoic anhydride and the meta- and para-hydroxybenzoic acids is advantageously heated in a vessel equipped with a rectifying column through which the resulting alkanoic acid vapors are allowed to pass and be removed while the alkanoic anhydride vapor condensate is returned to the residual material thereby furthering the condensation process. The temperature of the vessel is advantageously raised gradually during a period of several hours duration until a temperature of approximately 190°–210° C. has been attained; ordinarily from 4 to 6 hours will suffice. The residue is then advantageously heated for a similar period of time (about 4 to 6 hours) at from this temperature up to about a 20° C. greater temperature at a greatly reduced pressure of about 3–5 mm. of Hg pressure although higher pressures can be employed. The temperature is then raised with advantage by approximately an additional 10° to 30° C. and the pressure is reduced still further to approximately from 0.01 mm. to about 1–3 mm. of Hg pressure and these conditions maintained for an additional period of about the same duration or less (about 4 hours).

The resulting resinous polyester products are useful as molding plastics. They can be extruded by melt spinning processes to give strong, elastic fibers which possess the property of "cold drawing" when stretched. These polyesters are insoluble in most organic solvents but can be dissolved in such strong solvents as hot phenol, hot cresol or formic acid. They have softening points in the range of 180°–260° C.

In order to further illustrate the manner of practicing my invention, reference is made to the following examples:

Example 1

Twenty-one grams (0.15 mol) of m-hydroxybenzoic acid, 20 g. (0.20 mol) of acetic anhydride were mixed with 0.02 g. of zinc chloride. The mixture was placed in a distilling flask equipped with a column. The flask was heated and the acetic acid which formed was allowed to distill through the column. The temperature was gradually raised to 200° C. over a period of from 4 to 5 hours. Approximately 17 cc. of acetic acid was collected. The residual product in the flask was then heated for 4 hours at from 200° C. to 220° C. in a vacuum of from 3 to 5 mm. of Hg pressure. The vacuum was then increased to from 0.5 to 1.0 mm. of Hg pressure and the temperature was raised to from 230° to 240° C. and these conditions were maintained for an additional 4 hours. The final product thus obtained was a yellow, tough solid. It had a softening point between 190°–200° C. and was capable of being pulled into threads in this temperature range. These threads can be drafted to give strong, pliable fibers. The polyester can also be used for making molded objects by the usual molding methods.

Example 2

One mol of m-hydroxybenzoic acid, 1 mol of p-hydroxybenzoic acid and 2.5 mols of acetic anhydride were mixed with 0.05% (based on the weight of the combined benzoic acids) of zinc chloride.

The mixture was heated in a distilling flask equipped with a column and the temperature was gradually raised to 210° C. over a period of from 5 to 6 hours. The acetic acid which formed was removed as it distilled. The residual product in the flask was then heated for 6 hours at from 210° to 220° C. in a vacuum of 5 mm. of Hg pressure. The vacuum was then increased to from 0.01 mm. to 0.05 mm. of Hg pressure and the temperature was raised to from 240° to 250° C. and these conditions were maintained for an additional 4 hours. The final product that resulted was a tough solid that had a softening point between 200°–210° C. and can be pulled into fibers. Fibers so obtained are strong and pliable after they have been oriented by drafting.

Example 3

Two mols of m-hydroxybenzoic acid, 1 mol of vanillic acid and 4 mols of acetic anhydride were mixed with 0.04% (based on the weight of the combined benzoic acids) of calcium oxide.

This mixture was then treated in exactly the same manner as in Example 2. The final product that resulted was a hard, tough solid that had a softening point between 180—200° C. This product is useful as a molding plastic.

In a manner similar to that set forth in the above working examples, other meta- and para-hydroxybenzoic acids can be condensed employing actic anhydride or other alkanoic anhydrides as the condensation agents and ZnO, $ZNCl_2$, CaO, or NaOH as the catalyst. Thus a mixture of 3,2-cresotic acid, 4,2-cresotic acid and isovanillic acid can be condensed together in the presence of acetic anhydride and NaOH to form polyesters. Likewise, 4,3-cresotic acid can be condensed in the presence of acetic anhydride and ZnO to form a polyester.

What I claim as my invention and desire to secure by Letters Patent of the United States is:

1. A process for preparing polyesters comprising condensing, at an elevated temperature and under substantially anhydrous conditions, a hydroxybenzoic acid selected from the group consisting of those represented by the following formulas:

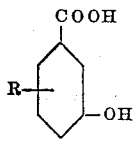

and

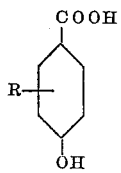

wherein R represents a member of the group consisting of a hydrogen atom and methyl, methoxy, ethyl and ethoxy radicals which is attached to the nucleus in a position selected from among the ortho, meta and para positions to the carboxy radical which is not already occupied by the hydroxy radical, in the presence of an alkanoic anhydride containing from 4 to 8 carbon atoms and in the presence of a catalyst selected from the group consisting of $ZnCl_2$, ZnO, the alkali metal oxides and hydroxides and the alkaline earth metal oxides and hydroxides, whereby the polyester obtained has a high molecular weight such that it softens in excess of about 180°–190° C.

2. The polyesters prepared in accordance with the process as defined in claim 1.

3. A process for preparing polyesters comprising condensing, at an elevated temperature and under substantially anhydrous conditions, p-hydroxybenzoic acid in the presence of acetic anhydride and a catalyst selected from the group consisting the $ZnCl_2$, ZnO, the alkali metal oxides and hydroxides and the alkaline earth metal oxides and hydroxides, whereby the polyester obtained has a high molecular weight such that it softens in excess of about 230°–260° C.

4. The polyesters prepared in accordance with the process as defined in claim 3.

5. A process for preparing polyesters comprising condensing, at an elevated temperature and under substantially anhydrous conditions, m-hydroxybenzoic acid in the presence of acetic anhydride and a catalyst selected from the group consisting of $ZnCl_2$, ZnO, the alkali metal oxides and hydroxides and the alkaline earth metal oxides and hydroxides, whereby the polyester obtained has a high molecular weight such that it softens in excess of about 180°–190° C.

6. The polyesters prepared in accordance with the process as defined in claim 5.

7. A process for preparing polyesters comprising condensing, at an elevated temperature and under substantially anhydrous conditions, vanillic acid in the presence of acetic anhydride and a catalyst selected from the group consisting of $ZnCl_2$, ZnO, the alkali metal oxides and hydroxides and the alkaline earth metal oxides and hydroxides, whereby the polyester obtained has a high molecular weight such that it softens in excess of about 180°–190° C.

8. The polyesters prepared in accordance with the process as defined in claim 7.

9. A process for preparing polyesters comprising condensing, at an elevated temperature and under substantially anhydrous conditions, a hydroxybenzoic acid selected from the group consisting of those represented by the following formulas:

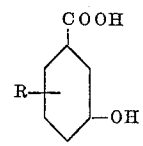

and

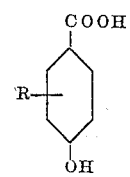

wherein R represents a member of the group consisting of a hydrogen atom and methyl, methoxy, ethyl and ethoxy radicals which is attached to the nucleus in a position selected from among the ortho, meta and para positions to the carboxy radical which is not already occupied by the hydroxy radical, in the presence of an alkanoic anhydride containing from 4 to 8 carbon atoms and in the presence of from 0.01% to 0.05% based on the weight of the hydroxybenzoic acids being condensed, of a catalyst selected from the group consisting of $ZnCl_2$, ZnO, the alkali metal oxides and hydroxides and the alkaline earth metal oxides and hydroxides, whereby the polyester obtained has a high molecular weight such that it softens in excess of about 180°–190° C.

10. A process for preparing polyesters comprising condensing, at an elevated temperature and under substantially anhydrous conditions, a hydroxybenzoic acid selected from the group consisting of those represented by the following formulas:

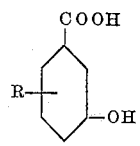

and

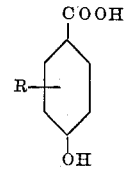

wherein R represents a member of the group consisting of a hydrogen atom and methyl methoxy, ethyl and ethoxy radicals which is attached to the nucleus in a position selected from among the ortho, meta and para positions to the carboxy radical which is not already occupied by the hydroxy radical, in the presence of a 20 to 100 molar per cent excess of acetic anhydride and in the presence of a catalyst selected from the group consisting of $ZnCl_2$, ZnO, the alkali metal oxides and hydroxides and the alkaline earth metal oxides and hydroxides, whereby the polyester obtained has a high molecular weight such that it softens in excess of about 180°–190° C.

11. A process for preparing polyesters comprising condensing, under substantially anhydrous conditions a hydroxybenzoic acid selected from the group consisting of those represented by the following formulas:

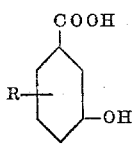

and

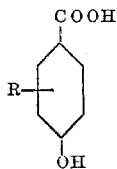

wherein R represents a member of the group consisting of a hydrogen atom and methyl, methoxy, ethyl and ethoxy radicals which is attached to the nucleus in a position selected from among the ortho, meta and para positions to the carboxy radical which is not already occupied by the hydroxy radical, in the presence of a 20 to 100 molar per cent excess of acetic anhydride and in the presence of from 0.01% to 0.05% based on the weight of the hydroxybenzoic acids being condensed, of a catalyst selected from the group consisting of $ZnCl_2$, ZnO, the alkali metal oxides and hydroxides and the alkaline earth metal oxides and hydroxides, and at a temperature which is increased over a time period of several hours from just high enough to remove acetic acid by distillation from the polymerizing mixture up to 220°–280° C., during the last few hours of which time period the pressure is greatly reduced, whereby the polyester obtained has a high molecular weight such that it softens in excess of about 180°–190° C.

12. A process for preparing polyesters as defined in claim 11 wherein the hydroxybenzoic acid is p-hydroxybenzoic acid, whereby the polyester obtained has a high molecular weight such that it softens in excess of about 230°–260° C.

13. A process for preparing polyesters as defined in claim 11 wherein the hydroxybenzoic acid is m-hydroxybenzoic acid.

14. A process for preparing polyesters as defined in claim 11 wherein the hydroxybenzoic acid is vanillic acid.

15. A process for preparing polyesters comprising condensing, under substantially anhydrous conditions, a hydroxybenzoic acid selected from the group consisting of those represented by the following formulas:

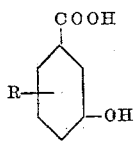

and

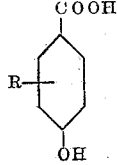

wherein R represents a member of the group consisting of a hydrogen atom and methyl, methoxy, ethyl and ethoxy radicals which is attached to the nucleus in a position selected from among the ortho, meta and para positions to the carboxy radical which is not already occupied by the hydroxy radical, in the presence of a 20 to 100 molar per cent excess of acetic anhydride and in the presence of from 0.01% to 0.05% based on the weight of the hydroxybenzoic acids being condensed, of a catalyst selected from the group consisting of $ZnCl_2$, ZnO, the alkali metal oxides and hydroxides, the condensation being conducted in a vessel provided with a heating means, a vapor condensing means and a pressure reducing means, whereby the temperature is increased gradually over a time period of 12 to 16 hours from just high enough to remove acetic acid by distillation from the reacting mixture up to 220°–260° C., during the last 8–10 hours of which time the pressure is reduced to from 0.01 to 5 mm. of Hg pressure, whereby the polyester obtained has a high molecular weight such that it softens in excess of about 180°–190° C.

16. A process for preparing polyesters comprising condensing, at a gradually increasing elevated temperature and under substantially anhydrous conditions, a hydroxybenzoic acid selected from the group consisting of those represented by the following formulas:

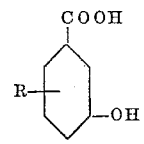

and

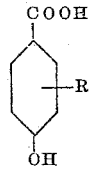

wherein R represents a member of the group consisting of a hydrogen atom and methyl, methoxy, ethyl and ethoxy radicals which is attached to the nucleus in a position selected from among the ortho, meta and para positions of the carboxy radical not already occupied by the hydroxy radical, in the presence of an alkanoic anhydride containing from 4 to 8 atoms and in the presence of a catalyst selected from the group consisting of $ZnCl_2$, ZnO, the alkali metal oxides and hydroxides and the alkaline earth metal oxides and hydroxides, whereby the polyester obtained has a high molecular weight such that it softens in excess of about 180°–190° C.

JOHN R. CALDWELL.

REFERENCES CITED

The following references are of record in the file of this patent:

UNITED STATES PATENTS

| Number | Name | Date |
|---|---|---|
| 2,349,952 | Fuller | May 30, 1944 |
| 2,471,023 | Cook | May 24, 1949 |

FOREIGN PATENTS

| Number | Country | Date |
|---|---|---|
| 344,034 | Germany | Nov. 12, 1921 |

OTHER REFERENCES

Chattaway: Jour. Chem. Soc. (London), pages 2495–2496 (1931).